United States Patent
Chen et al.

(10) Patent No.: US 11,265,923 B2
(45) Date of Patent: Mar. 1, 2022

(54) METHOD AND DEVICE FOR NPRACH DETECTION

(71) Applicant: Nokia Technologies Oy, Espoo (FI)

(72) Inventors: Xiaojun Chen, Hangzhou (CN); Zhenting Li, Hangzhou (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/770,929

(22) PCT Filed: Dec. 29, 2017

(86) PCT No.: PCT/CN2017/119924
§ 371 (c)(1),
(2) Date: Jun. 8, 2020

(87) PCT Pub. No.: WO2019/127396
PCT Pub. Date: Jul. 4, 2019

(65) Prior Publication Data
US 2021/0168870 A1 Jun. 3, 2021

(51) Int. Cl.
*H04W 74/08* (2009.01)
*H04B 17/318* (2015.01)

(52) U.S. Cl.
CPC ...... *H04W 74/0833* (2013.01); *H04B 17/318* (2015.01)

(58) Field of Classification Search
CPC .................. H04W 74/0833; H04B 17/318
See application file for complete search history.

(56) References Cited

U.S. PATENT DOCUMENTS

| 9,584,300 B2 * | 2/2017 | Yang ................. H04W 72/0453 |
| 2008/0165903 A1 | 7/2008 | Hooli et al. |

(Continued)

FOREIGN PATENT DOCUMENTS

| CN | 101295999 A | 10/2008 |
| CN | 102316601 A | 1/2012 |

(Continued)

OTHER PUBLICATIONS

Qualcomm, "NPRACH Reliability Enhancement," Aug. 21, 2017, 3GPP TSG RAN1#90, pp. 2-3.*

(Continued)

*Primary Examiner* — Charles C Jiang
*Assistant Examiner* — Ryan C Kavleski
(74) *Attorney, Agent, or Firm* — Squire Patton Boggs (US) LLP

(57) ABSTRACT

Embodiments of the present disclosure relate to a method and device for NPRACH detect. In example embodiments, the method comprises determining whether an overlapping ratio between a first period and a second period exceeds a first threshold. A first NPRACH resource is available during the first period and a second NPRACH resource is available during the second period. The first NPRACH resource is associated with a first coverage level and the second NPRACH resource is associated with a second coverage level. The second coverage level is different from the first coverage level. The method also comprises in response to determining that the overlapping ratio exceeds the first threshold, determining a power estimation of noise based on a first plurality of signals received on the first PRACH resource and a second plurality of signals received on the second NPRACH resource. The method also comprises detecting existence of at least one random access preamble (Continued)

on the first NPRACH resource based on the power estimation of noise.

13 Claims, 5 Drawing Sheets

(56) References Cited

U.S. PATENT DOCUMENTS

| | | | |
|---|---|---|---|
| 2013/0136023 A1 | 5/2013 | Zhang et al. | |
| 2016/0353440 A1 | 12/2016 | Lee et al. | |
| 2017/0324587 A1 | 11/2017 | Lin et al. | |
| 2017/0359839 A1 | 12/2017 | Wang et al. | |
| 2018/0242101 A1* | 8/2018 | Lin | H04W 64/00 |
| 2019/0052339 A1* | 2/2019 | Zhou | H04B 17/17 |
| 2019/0349985 A1* | 11/2019 | Lin | H04L 27/2613 |

FOREIGN PATENT DOCUMENTS

| | | |
|---|---|---|
| CN | 103037392 A | 4/2013 |
| CN | 103108338 A | 5/2013 |

OTHER PUBLICATIONS

Extended European Search Report received for corresponding European Patent Application No. 17936364.3, dated Jul. 14, 2021, 11 pages.

"NPRACH Resource Partition for Early Data Transmission", 3GPP TSG-RAN WG2 Meeting #99bis, R2-1711633, Agenda : 9.13.1, MediaTek Inc., Oct. 9-13, 2017, pp. 1-4.

"NPRACH False Alarm Reduction for NB-IoT", 3GPP TSG-RAN WG1 #89, R1-1706891, Agenda : 6.2.7.3, Ericsson, May 15-19, 2017, 7 pages.

"3rd Generation Partnership Project; Technical Specification Group Radio Access Network; Evolved Universal Terrestrial Radio Access (E-UTRA); Physical channels and modulation (Release 14)", 3GPP TS 36.211, V14.3.0, Jun. 2017, pp. 1-195.

International Search Report and Written Opinion received for corresponding Patent Cooperation Treaty Application No. PCT/CN2017/119924, dated Jun. 28, 2018, 9 pages.

"NPRACH Reliability Enhancement for NB-IoT", 3GPP TSG-RAN WG1 Meeting #91, R1-1719730, Agenda : 6.2.6.4, ZTE, Nov. 27-Dec. 1, 2017, 6 pages.

* cited by examiner

METHOD AND DEVICE FOR NPRACH DETECTION

RELATED APPLICATION

This application claims priority to PCT Application No. PCT/CN2017/119924, filed on Dec. 29, 2017, which is incorporated herein by reference in its entirety.

TECHNICAL FIELD

Embodiments of the present disclosure generally relate to the field of telecommunications, and in particular, to a method and device for Narrow Band Physical Random Access Channel (NPRACH) detection.

BACKGROUND

Narrow Band Internet of Things (NB-IoT) is increasingly notable in the field of future wireless and Internet of Things (IoT) technologies. In the third generation partner project (3GPP) standardization, the NB-IoT specification partially inherits from the Long Term Evolution (LTE) specification. In addition, the NB-IoT specification has a lot of specific characteristics, such as a narrow band, a requirement of enhancing transmission coverage, a half-duplex transmission mode, and the like. Accordingly, many LTE receiver algorithms (or techniques) cannot be applicable to a NB-IoT receiver. There is a need of designing dedicated NB-IoT receiver algorithms aimed at the corresponding characteristics in order to improve performance. With the increasing deployment of NB-IoT networks in more and more regions, the above need is more and more vital and significant.

SUMMARY

In general, example embodiments of the present disclosure provide a method, device and computer readable medium for NPRACH detection.

In a first aspect, a method implemented in a network device is provided. The method comprises determining whether an overlapping ratio between a first period and a second period exceeds a first threshold. A first NPRACH resource is available during the first period and a second NPRACH resource is available during the second period. The first NPRACH resource is associated with a first coverage level and the second NPRACH resource is associated with a second coverage level. The second coverage level is different from the first coverage level. The method also comprises in response to determining that the overlapping ratio exceeds the first threshold, determining a power estimation of noise based on a first plurality of signals received on the first PRACH resource and a second plurality of signals received on the second NPRACH resource. The method also comprises detecting existence of at least one random access preamble on the first NPRACH resource based on the power estimation of noise.

In some embodiments, determining the power estimation of noise comprises: extracting, from the second plurality of signals, signals that are received over a time segment of the second period, the time segment overlapping with the first period; and determining the power estimation of noise based on the first plurality of signals and the extracted signals.

In some embodiments, determining the power estimation of noise based on the first plurality of signals and the extracted signals comprises: determining power estimations of the extracted signals; scaling the power estimations by the overlapping ratio to obtain the scaled power estimations; and in response to the scaled power estimation of at least one of the extracted signals being below a second threshold, determining the at least one of the extracted signals as a statistic sample for determining the power estimation of noise.

In some embodiments, the second NPRACH resource includes a first resource segment and a second resource segment, the first resource segment is within a first frequency hopping period and the second resource segment is within a second frequency hopping period that is subsequent to the first frequency hopping period.

In a second aspect, there is provided a network device. The network device comprises a controller and a memory including instructions. The instructions, when executable by the controller, cause the network device to perform acts. The acts comprise: determining whether an overlapping ratio between a first period and a second period exceeds a first threshold, a first narrowband physical random access channel (NPRACH) resource being available during the first period, a second NPRACH resource being available during the second period, the first NPRACH resource being associated with a first coverage level and the second NPRACH resource being associated with a second coverage level that is different from the first coverage level; in response to determining that the overlapping ratio exceeds the first threshold, determining a power estimation of noise based on a first plurality of signals received on the first PRACH resource and a second plurality of signals received on the second NPRACH resource; and detecting existence of at least one random access preamble on the first NPRACH resource based on the power estimation of noise.

In a third aspect, there is provided a computer readable medium having instructions stored thereon. The instructions, when executed on at least one processor, cause the at least one processor to carry out acts. The acts comprise: determining whether an overlapping ratio between a first period during which a first narrowband physical random access channel (NPRACH) resource is available and a second period during which a second NPRACH resource is available exceeds a first predetermined threshold, the first NPRACH resource being associated with a first coverage level and the second NPRACH resource being associated with a second coverage level that is different from the first coverage level; in response to determining that the overlapping ratio exceeds the predetermined threshold, determining a power estimation of noise based on first signals received on the first PRACH resource and second signals received on the second NPRACH resource; and determining, based on the power estimation of noise, whether at least one random access preamble is received on the first NPRACH resource.

In a fourth aspect, there is provided an apparatus for narrowband physical random access channel (NPRACH) detection. The apparatus comprises a subcarrier selector, a power accumulator and estimator, a first noise estimator, a first SNR estimator and a first detector.

The subcarrier selector is configured to: determine whether an overlapping ratio between a first period and a second period exceeds a first threshold, a first NPRACH resource being available during the first period, a second NPRACH resource being available during the second period, the first NPRACH resource being associated with a first coverage level and the second NPRACH resource being associated with a second coverage level that is different from the first coverage level, and extract, from input signals in frequency domain, a first plurality of signals received on the first PRACH resource and a second plurality of signals received on the second NPRACH resource in response to determining that the overlapping ratio exceeds the first threshold.

The power accumulator and estimator is configured to: accumulate powers for the first plurality of signals and the second plurality of signals, respectively, and determine power estimations of signal plus noise for the first plurality of signals and the second plurality of signals.

The first noise estimator is configured to determine power estimations of noise for each of the first plurality of signals and for each of the second plurality of signals.

The first SNR estimator is configured to determine Signal Noise Ratio (SNR) estimations for the first plurality of signals and SNR estimations for the second plurality of signals.

The first detector is configured to: compare each of the SNR estimations for the first plurality of signals and the SNR estimations for the second plurality of signals with a second threshold, in response to the SNR estimation for at least one of the first plurality of signals exceeds the second threshold, determine that the at least one of the first signal includes a random access preamble, and in response to the SNR estimation for at least one of the second plurality of signals exceeds the second threshold, determine that the at least one of the second signal includes a random access preamble.

In some embodiments, the apparatus further comprises: a second noise estimator configured to determine an average power estimation of noise over frequency for a first number of signals among the first plurality of signals and a second number of signals among the second plurality of signals; a second SNR estimator configured to: determine, based on the average power estimation of noise, a first plurality of SNR estimations for the first plurality of signals and a second plurality of SNR estimations for the second plurality of signals; and a second detector configured to: compare each of the first plurality of SNR estimations and the second plurality of SNR estimations with the second threshold, in response to the first SNR estimation for at least one of the first plurality of signals exceeding the second threshold, determine that the at least one of the first signal includes the random access preamble, and in response to the second SNR estimation for at least one of the second plurality of signals exceeding the second threshold, determine that the at least one of the second signal includes the random access preamble.

In some embodiments, the apparatus further comprises: a frequency hopping controller; and a subcarrier reorder configured to reorder, under control of the frequency hopping controller, the first plurality of signals and the second plurality of signals to obtain a first plurality of ordered signals and a second plurality of ordered signals.

In some embodiments, the second detector is further configured to determine a first set of indexes of a first plurality of subcarriers that are used, and a second set of indexes of a second plurality of subcarriers that are used, the first plurality of subcarriers being associated with the first coverage level, and the second plurality of subcarriers being associated with the second coverage level.

In some embodiments, the apparatus further comprises: a removal module configured to remove the second set of indexes and output the first set of indexes as a result of the NPRACH detection.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Figure 1:
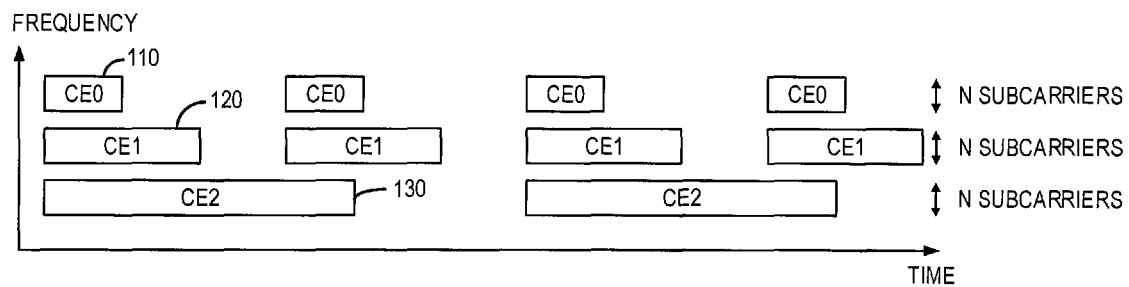
FIG. 1 shows an example NPRACH resource configuration.

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "network device" or "base station" (BS) refers to a device which is capable of providing or hosting a cell or coverage where terminal devices can communicate. Examples of a network device include, but not limited to, a Node B (NodeB or NB), an Evolved NodeB (eNodeB or eNB), a Remote Radio Unit (RRU), a radio head (RH), a remote radio head (RRH), a low power node such as a femto node, a pico node, and the like. For the purpose of discussion, in the following, some embodiments will be described with reference to eNB as examples of the network device.

As used herein, the term "terminal device" refers to any device having wireless or wired communication capabilities. Examples of the terminal device include, but not limited to, user equipment (UE), personal computers, desktops, mobile phones, cellular phones, smart phones, personal digital assistants (PDAs), portable computers, image capture devices such as digital cameras, gaming devices, music storage and playback appliances, or Internet appliances enabling wireless or wired Internet access and browsing and the like. For the purpose of discussion, in the following, some embodiments will be described with reference to UEs as examples of terminal devices and the terms "terminal device" and "user equipment" (UE) may be used interchangeably in the context of the present disclosure.

As used herein, the singular forms "a", "an" and "the" are intended to include the plural forms as well, unless the context clearly indicates otherwise. The term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be included below.

In some examples, values, procedures, or apparatus are referred to as "best," "lowest," "highest," "minimum," "maximum," or the like. It will be appreciated that such descriptions are intended to indicate that a selection among many used functional alternatives can be made, and such selections need not be better, smaller, higher, or otherwise preferable to other selections.

It should be noted that configurations for the NPRACH resources are described only for the purpose of illustration and help those skilled in the art to understand idea and principle of the present disclosure, without suggesting any limitations as to the scope of the disclosure. The present disclosure can be implemented with appropriate configurations for the NPRACH resources other than the ones described below.

Implementations of the present disclosure relate to communications in narrowband networks, such as narrowband-Internet of Things (NB-IoT) communication systems. The narrowband systems such as NB-IoT work on a narrowband with a small bandwidth such as 180 kHz, which is equal to the bandwidth of only one physical resource block (PRB) in existing LTE systems. NB-IoT can be deployed in some existing communication networks such as LTE networks and may follow some basic communication specifications of the existing networks. In the following, implementations of the present disclosure will be described with reference to NB-IoT in LTE systems. However, it would be appreciated that the implementations may also be adapted to other narrowband systems.

Typically, in order to communicate data with a network device, a terminal device may initiate a random access procedure to establish a connection with the network device. Specifically, the terminal device may transmit a random access preamble as a random access request to the network device on a preconfigured time-frequency resource. In the NB-IoT, time-frequency resources on which the random access preambles are transmitted are referred to as NPRACH resources. The NPRACH resources are typically periodic in time domain and include a predetermined number of consecutive subcarriers (or channels) in frequency domain.

For the purpose of coverage enhancement, terminal devices in a cell may be classified into a plurality of coverage levels corresponding to respective Maximum Coupling Losses (MCLs). For example, the terminal devices may be classified into three coverage levels, i.e. normal, robust and extreme coverage levels, which correspond to Maximum Coupling Loss (MCL) of 144 dB, 154 dB, 164 dB respectively. The normal, robust and extreme coverage levels are also referred to as coverage enhancement (CE) 0, CE 1 and CE 2. For each of the three coverage levels, transmission of a random access preamble is restricted within certain time-frequency resources. In the following, implementations of the present disclosure will be described with reference to the three coverage levels as mentioned above. However, it would be appreciated that number of the coverage levels may be determined based on requirements for coverage enhancement. The implementations of the present disclosure may also be adapted to coverage levels of other numbers.

FIG. 1 shows an example configuration of the NPRACH resources for the three coverage levels. In the example as shown in FIG. 1, the NPRACH resources occupy a bandwidth of 180 kHz in frequency domain, which is divided into forty-eight consecutive subcarriers. Each of the subcarriers occupies a bandwidth of 3.75 kHz. The NPRACH resources include a first NPRACH resource 110 associated with CE 0, a second NPRACH resource 120 associated with CE 1 and a third NPRACH resource 130 associated with CE 2. Each of the first, second and third NPRACH resources has periodicity and includes N consecutive subcarriers. For example, N is equal to twelve.

It should be noted that numbers of the subcarriers as used herein are described only for the purpose of illustration and help those skilled in the art to understand idea and principle of the present disclosure, without suggesting any limitations as to the scope of the disclosure. The present disclosure can be implemented with appropriate numbers of the subcarriers other than the ones described below.

In order to transmit the random access preamble to the network device, the terminal device determines one of the three coverage levels based on an estimation of the MCL. In turn, the terminal device selects one of the twelve consecutive subcarriers associated with the determined coverage level and transmits the random access preamble to the network device on the selected subcarrier.

Figure 2:
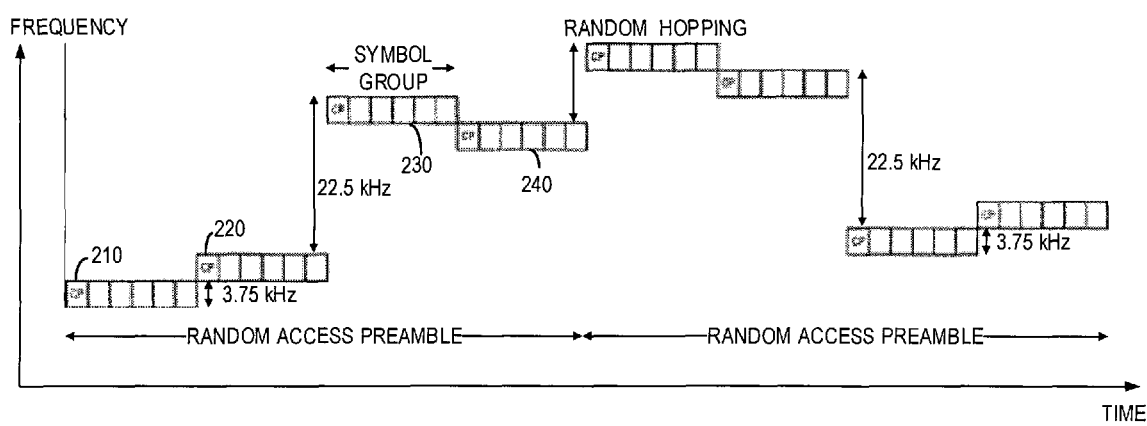
FIG. 2 is a schematic diagram illustrating an example transmission process of a random access preamble.

FIG. 2 is a schematic diagram illustrating an example transmission of a random access preamble on a subcarrier. The random access preamble includes four symbol groups that are transmitted without gaps. Each of the four symbol groups includes a cyclic prefix (CP) and five identical symbols. The transmission of the random access preamble on a subcarrier has a preconfigured number of repetitions. The three coverage levels may be preconfigured with respective number of repetitions of transmissions of random access preambles.

In the example as shown in FIG. 2, the random access preamble includes symbol groups 210, 220, 230 and 240 that are transmitted without gaps. For the purpose of illustration, FIG. 2 shows only two repetitions of transmission of the random access preamble.

In some embodiments, the symbol groups may be transmitted in a predetermined pattern of frequency hopping to reduce interference. For example, as shown in FIG. 2, there is 3.75 kHz frequency hopping between symbol groups 210 and 220, there is 22.5 kHz frequency hopping between symbol groups 220 and 230, there is 3.75 kHz frequency hopping between symbol groups 230 and 240. In addition, there may be random frequency hopping between symbol groups within different repetitions. It would be appreciated that values of frequency hopping are described for the purpose of illustration, without suggesting any limitations as to the scope of the disclosure. Any appropriate values of frequency hopping may be employed in embodiments of the present disclosure. Alternatively, the symbol groups may be transmitted without frequency hopping.

Since the random access procedure is initiated by the terminal device autonomously, the network device does not know in advance whether there is a random access preamble from the terminal device on each of the subcarriers.

In order to determine whether there is a random access preamble from a terminal device on each of the subcarriers, a conventional approach for detecting random access preambles is proposed. In the conventional approach, a network device independently detect, for each of the three coverage levels, whether there is a random access preamble on each of the subcarriers associated with respective coverage level.

Specifically, the conventional approach employs a first detection process and a second optional detection process. During the first detection process, for each of the three coverage levels, the network device determines a power estimation of signal plus noise and a first power estimation of noise for each of the subcarriers associated with respective coverage level. In the first detection process, the principle of determining the power estimation of signal plus noise and the principle of determining the first power estimation of noise are not correlated.

The network device determines a first estimation of Signal Noise Ratio (SNR) for each of the subcarriers based on the power estimation of signal plus noise and the first power estimation of noise. In turn, the network device compares the first estimation of SNR with a threshold. If the first estimation of SNR for a subcarrier exceeds the threshold, it is determined that there is a random access preamble on the subcarrier. Otherwise, it is determined that there is noise on the subcarrier. In this way, for each of the three coverage levels, the network device may determine the number of the subcarriers that are used by terminal devices to transmit random access preambles and the number of the subcarriers that are not used.

Since the principle of the power estimation of signal plus noise and the principle of the first power estimation of noise are not correlated, a high false alarm rate is caused by the first detection process. In order to reduce the false alarm rate, the second detection process subsequent to the first detection process is selectively enabled based on the number of the subcarriers that are not used. If the number of the subcarriers that are not used exceeds a predetermined threshold, the second detection process is enabled. Otherwise, the second detection process is disabled.

During the second detection process, for each of the three coverage levels, the network device determines an average power estimation of noise over the number of the subcarriers that are not used. Then, for each of the three coverage levels, the network device determines whether there is a random access preamble on each of the subcarriers based on the power estimation of signal plus noise determined during the first detection process and the average power estimation of noise. Because the principle of determining the power estimation of signal plus noise and the principle of determining the average power estimation of noise are correlated, the false alarm rate will be reduced.

However, as described with reference to FIG. 1, the total number of consecutive subcarriers included in the NPRACH resources is as small as forty-eight. Thus, number of consecutive subcarriers included in a NPRACH resource associated with one coverage level is very small, typically twelve. As such, the second detection process is enabled under very few cases, i.e. its enabling probability is very low.

According to embodiments of the present disclosure, there is proposed a solution for NPRACH detection. In this solution, it is determined whether an overlapping ratio between a first period and a second period exceeds a first threshold. A first NPRACH resource is available during the first period and a second NPRACH resource is available during the second period. The first NPRACH resource is associated with a first coverage level and the second NPRACH resource is associated with a second coverage level that is different from the first coverage level. If the overlapping ratio exceeds a first threshold, both signals received on the first PRACH resource and signals received on the second NPRACH resource are used as statistic samples for determining a power estimation of noise. Thus, the number of statistic samples for determining the power estimation of noise is increased, thereby reducing error of estimation.

Figure 3:
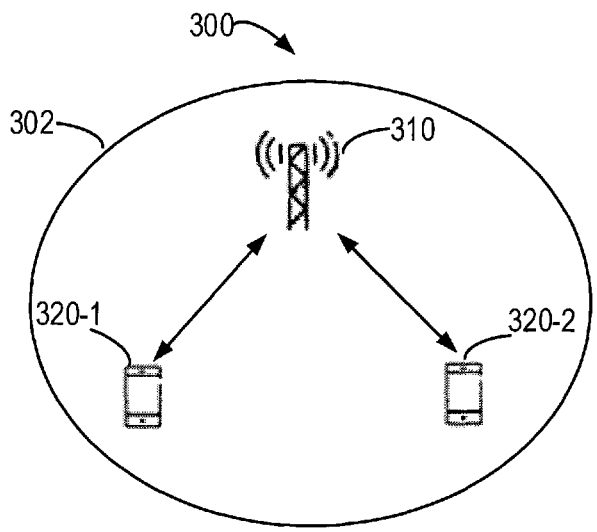
FIG. 3 shows an example communication network in which embodiments of the present disclosure can be implemented.

FIG. 3 shows an example communication network 300 in which embodiments of the present disclosure can be implemented. The network 300 includes a network device 310 and terminal devices 320-1 and 320-2 (hereinafter collectively referred to as terminal devices 320 or individually referred to as a terminal device 320) served by the network device 310. The serving area of the network device 310 is called as a cell 302. It is to be understood that the number of network devices and terminal devices is only for the purpose of illustration without suggesting any limitations. The network 300 may include any suitable number of network devices and terminal devices adapted for implementing embodiments of the present disclosure. Although not shown, it would be appreciated that one or more terminal devices may be located in the cell 302 and served by the network device 310.

The terminal device 320 may transmit a random access preamble to the network device 310 so as to establish a connection with the network device 310 by using any suitable communication technology and following any suitable communication standard. Examples of the communication technology include, but are not limited to, Long Term Evolution (LTE), LTE-Evolution, LTE-Advanced (LTE-A), Wideband Code Division Multiple Access (WCDMA), Code Division Multiple Access (CDMA) and Global System for Mobile Communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

Figure 4:
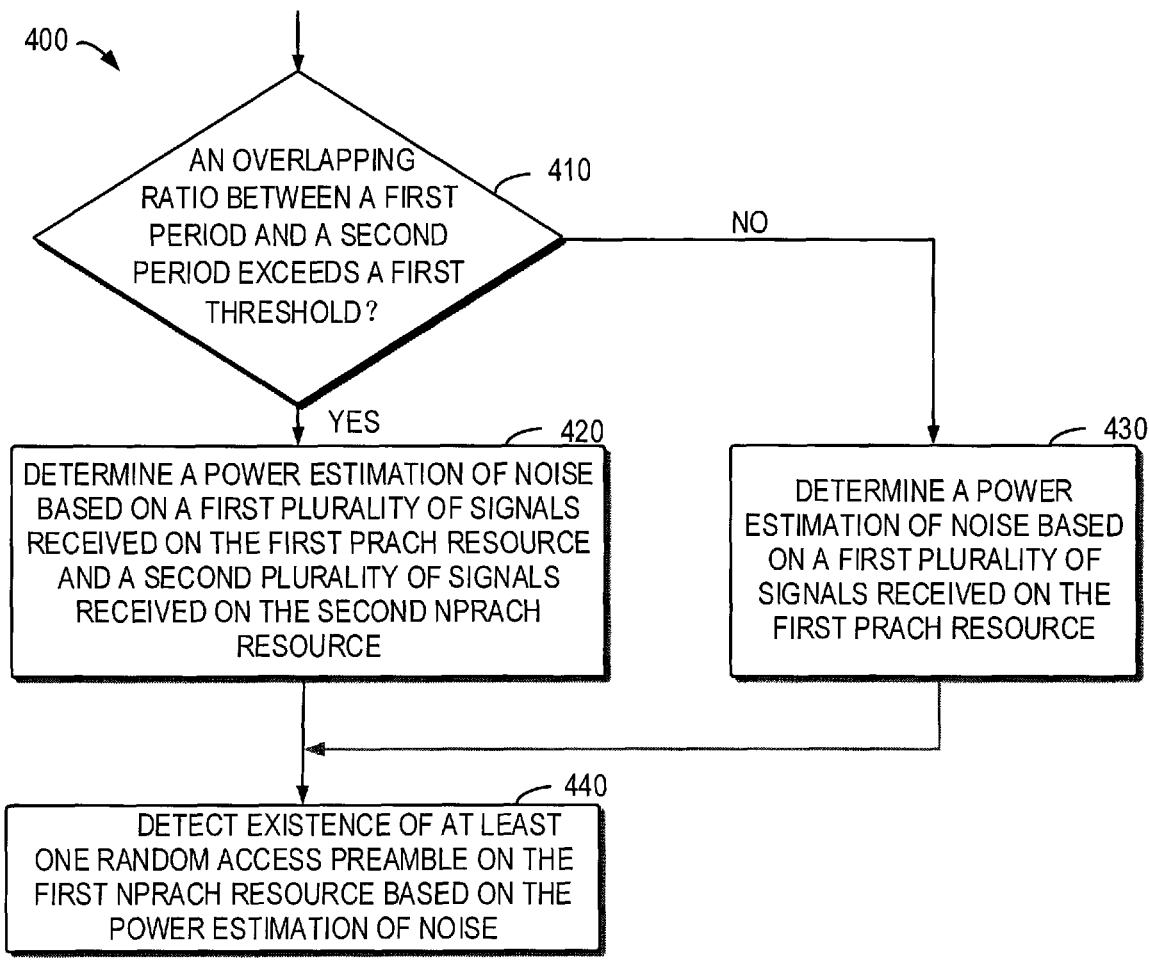
FIG. 4 shows a flowchart of an example method in accordance with some embodiments of the present disclosure.

Principle and implementations of the present disclosure will be described in detail below with reference to FIG. 4, which shows a flowchart of an example method 400 in accordance with some embodiments of the present disclosure. For the purpose of discussion, the method 400 will be described with reference to FIG. 1. The method 400 may involve the network device 310 and the terminal device 320 in FIG. 1. The method 400 relates to a random access procedure initiated by the terminal device 320. The method 400 may be implemented in narrowband communication systems, such as NB-IoT communication systems.

At 410, the network device 310 determines whether an overlapping ratio between a first period and a second period exceeds a first threshold. A first NPRACH resource is available during the first period and a second NPRACH resource is available during the second period. The first NPRACH resource is associated with a first coverage level and the second NPRACH resource is associated with a second coverage level. The second coverage level is different from the first coverage level.

The network device 310 knows in advance configurations for the first and second NPRACH resources, such as periodicity, number of NPRACH repetitions and a starting time. Thus, the network device 310 may determine the first period based on a first periodicity, a first number of NPRACH repetitions and a first starting time for the first NPRACH resource and determine the second period based on a second periodicity, a second number of NPRACH repetitions and a second starting time for the second NPRACH resource. In turn, the network device 310 may determine the overlapping ratio between the first period and the second period based on the current time.

Figure 5:
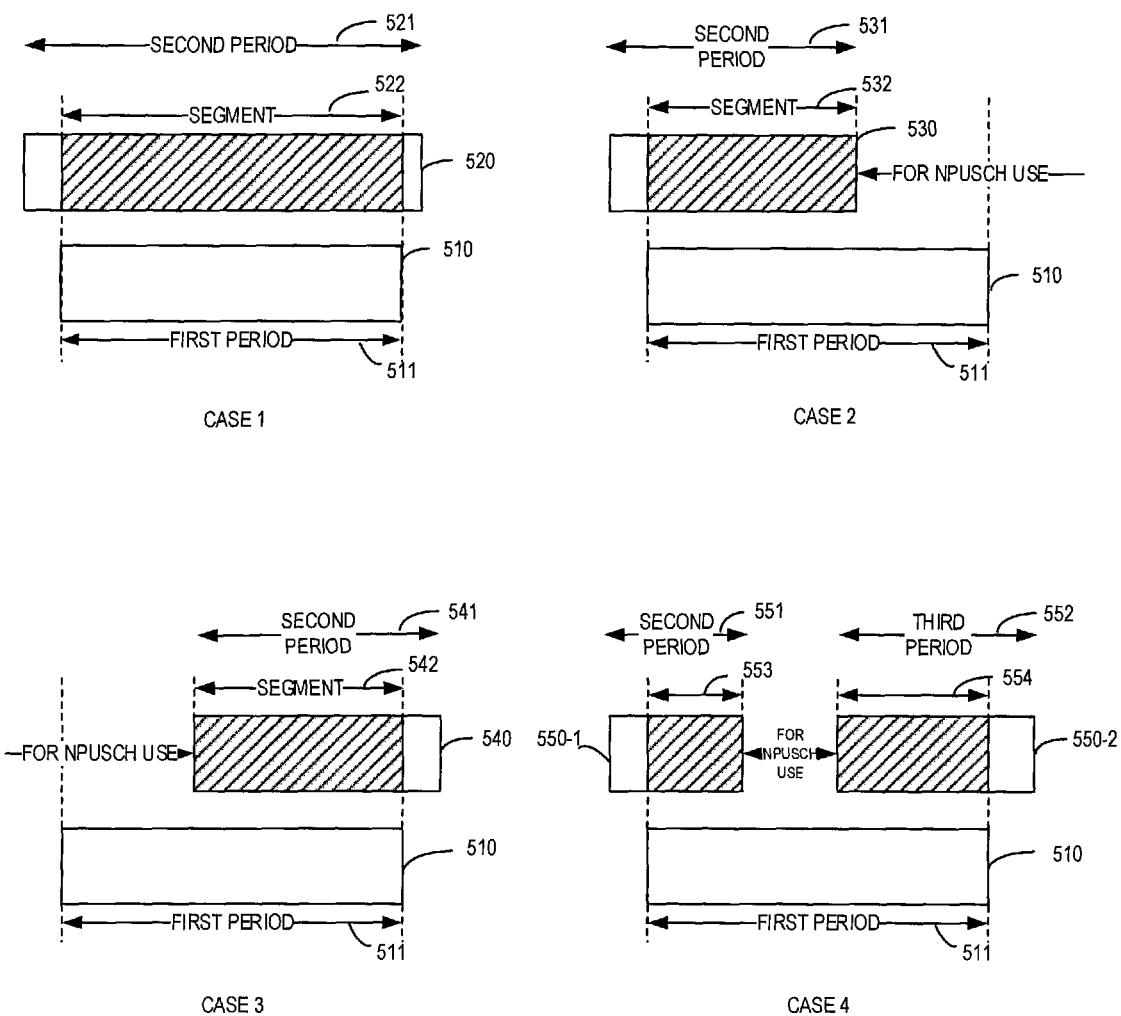
FIG. 5 shows examples of overlap between the first period and the second period.

FIG. 5 shows examples of overlap between the first period and the second period. Four cases, i.e., CASE 1, CASE 2, CASE 3 and CASE 4, are shown. In CASE 1, the first NPRACH resource 510 associated with the first coverage level is available during the first period 511. The second NPRACH resource 520 associated with the second coverage level is available during the second period 521. A time segment 522 of the second period 521 overlaps with the first period 511.

In CASE 2, the second NPRACH resource 530 associated with the second coverage level is available during the second period 531. A time segment 532 of the second period 531 overlaps with the first period 511. Similarly, in CASE 3, the second NPRACH resource 540 associated with the second coverage level is available during the second period 541. A time segment 542 of the second period 541 overlaps with the first period 511.

In CASE 4, the second NPRACH resource includes a first resource segment 550-1 and a second resource segment 550-2, both of which are associated with the second coverage level. The first resource segment 550-1 is available during the second period 551. The second resource segment 550-2 is available during a third period 552. A time segment 553 of the second period 551 and a time segment 554 of the third period 552 overlap with the first period 511. The first resource segment 550-1 and the second resource segment 550-2 may be within different frequency hopping periods. For example, the first resource segment 550-1 may be within a first frequency hopping period and the second resource segment 550-2 may be within a second frequency hopping period. The second frequency hopping period may be subsequent to the first frequency hopping period. Thereby, signals received on the second NPRACH resource in different frequency hopping periods may be used for determining the power estimation of noise.

With respect to CASE 1, if the first coverage level is CE 0, the second coverage level may be CE 1 or CE 2, as described with reference to FIG. 1. If the first coverage level is CE 1, the second coverage level may be CE 2. With respect to CASE 2 and CASE 3, if the first coverage level is CE 2, the second coverage level may be CE 0 or CE 1, as described with reference to FIG. 1. If the first coverage level is CE 1, the second coverage level may be CE 0. With respect to CASE 4, if the first coverage level is CE 2, the second coverage level may be CE 1 or CE 0, as described with reference to FIG. 1. In the case where the first coverage level is CE 1, the second coverage level may be CE 0. Of course, the first coverage level and the second coverage level may be any appropriate coverage levels determined based on requirements for coverage enhancement. The scope of the present disclosure is not limited in this regard.

Referring back to FIG. 1, it can be seen that a period where the first NPRACH resource 110 associated with CE 0 is available, a period where the second NPRACH resource 120 associated with CE 1 is available, and a period where the third NPRACH resource 130 associated with CE 2 is available, overlap with each other. In this case, in order to detect existence of at least one random access preamble on the first NPRACH resource 110, signals received on the first PRACH resource 110, signals received on the second NPRACH resource 120 and signals received on the third NPRACH resource 130 may be used as statistic samples for determining a power estimation of noise. Thus, the number of statistic samples for determining the power estimation of noise will be further increased, thereby further reducing error of estimation. Similarly, in order to detect existence of at least one random access preamble on the second NPRACH resource 120 or on the third NPRACH resource 130, the signals received on the first, second and third PRACH resources may be used as statistic samples for determining a power estimation of noise.

In some embodiments, the first threshold may be in the range of 30% to 70%. It should be noted that the range of the first threshold is only exemplary, without suggesting any limitations as to the scope of the disclosure.

Referring back to FIG. 4, if the network device 310 determines that the overlapping ratio exceeds the first threshold at 410, the network device 310 determines, at 420, a power estimation of noise based on a first plurality of signals received on the first PRACH resource and a second plurality of signals received on the second NPRACH resource. Details of the determination of the power estimation of noise will be described hereinafter with reference to FIG. 6. On the other hand, if the network device 310 determines that the overlapping ratio is below the first threshold at 410, the network device 310 determines, at 430, a power estimation of noise based on a first plurality of signals received on the first PRACH resource.

At 440, the network device 310 detects existence of at least one random access preamble on the first NPRACH resource based on the power estimation of noise.

According to the embodiments of the present disclosure, both signals received on the first PRACH resource and signals received on the second NPRACH resource are used as statistic samples for determining a power estimation of noise. Thus, the number of the statistic samples is increased, thereby reducing error of estimation.

Figure 6:
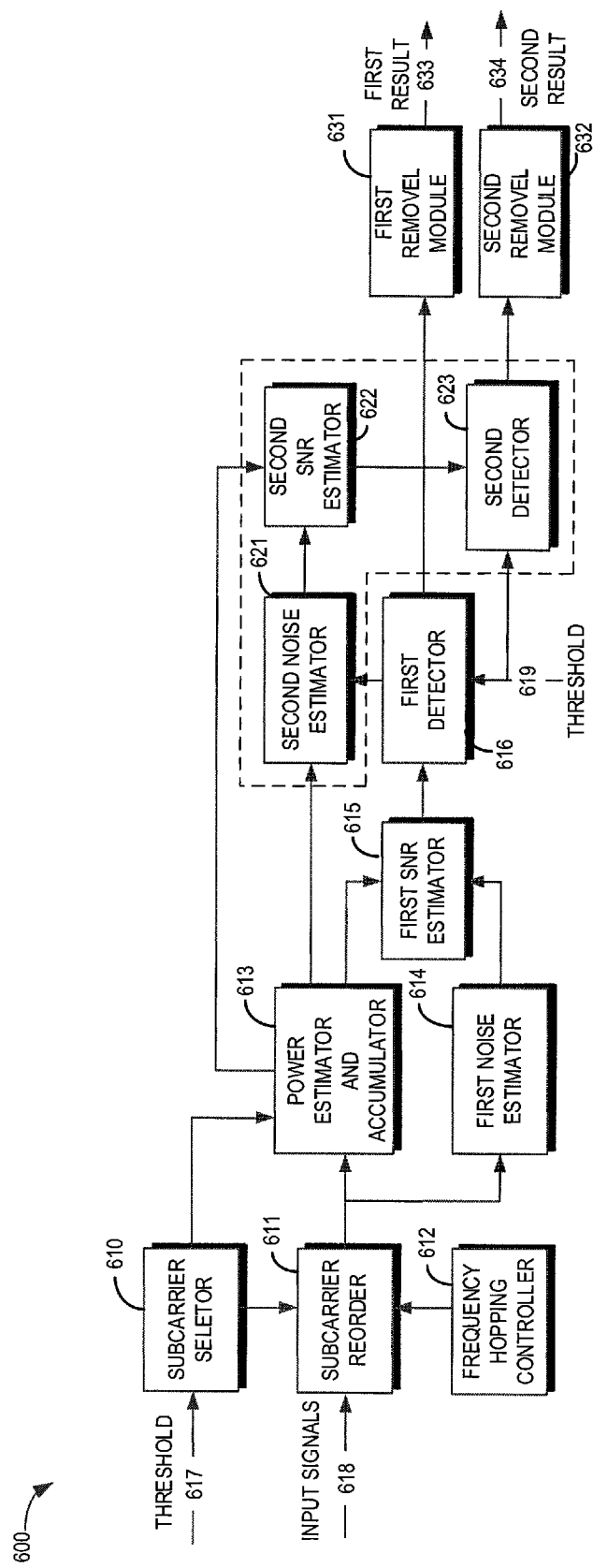
FIG. 6 shows a block diagram of a device of NPRACH detection in accordance with some embodiments of the present disclosure.

FIG. 6 shows a block diagram of a system 600 of NPRACH detection in accordance with some embodiments of the present disclosure. It is to be understood that the block diagram of FIG. 6 is not intended to indicate that the system 600 is to include all of the components as shown in FIG. 6. Rather, the system 600 can include fewer or additional components not illustrated in FIG. 6 (e.g., additional applications, additional modules, additional memory systems, additional network interfaces, etc.). For the purpose of discussion, the system 600 will be described with reference to FIG. 1, FIG. 2 and CASE 2 as shown in FIG. 5. However, it would be appreciated that the system 600 may be used with other cases as shown in FIG. 5.

Generally, for each of the three coverage levels as described above, the system 600 may detect existence of at least one random access preamble on the respective NPRACH resource based on the power estimation of noise.

As shown, the system 600 includes a subcarrier selector 610, a subcarrier reorder 611, a frequency hopping controller 612, a power accumulator and estimator 613, a first noise estimator 614, a first SNR estimator 615, a first detector 616 and a first removal module 633.

The subcarrier selector 610 is configured to determine whether an overlapping ratio between the first period 511 and the second period 531 exceeds a first threshold 617. The first threshold 617 may be in the range of 30% to 70%, for example. For example, the first threshold 617 may be determined as 60%.

In the example as shown in CASE 2 of FIG. 5, the subcarrier selector 610 may determine that the time segment 532 of the second period 531 overlaps with the first period 511. In turn, the subcarrier selector 610 may determine a ratio between the time segment 532 and the first period 511 as the overlapping ratio, for example 62%. Thus, the overlapping ratio exceeds the first threshold 617 (i.e., 60%).

The subcarrier selector 610 is further configured to extract, from input signals 618 in frequency domain, a first plurality of signals received on the first PRACH resource 510 and a second plurality of signals received on the second NPRACH resource 530.

In some embodiments, in order to reduce computation complexity of the power accumulator and estimator 613, the subcarrier selector 610 may be further configured to extract, from the second plurality of signals, signals that are received over the time segment 532 of the second period 531 that overlaps with the first period 511, so as to obtain a second plurality of extracted signals.

The first NPRACH resource 510 and the second NPRACH resource 530 each may include twelve consecutive subcarriers as shown in FIG. 1. In the circumstances, the first plurality of signals include twelve signals received on the twelve consecutive subcarriers in the first NPRACH resource 510, and the second plurality of extracted signals include twelve signals received on the twelve consecutive subcarriers in the second NPRACH resource 530.

As described with reference to FIG. 2, the random access preamble including four symbol groups may be transmitted in a predetermined pattern of frequency hopping to reduce interference. In this case, for ease of power accumulation by the power accumulator and estimator 613, the subcarrier reorder 611 is configured to reorder, under control of the frequency hopping controller 612, the first plurality of signals and the second plurality of extracted signals to obtain the first plurality of ordered signals and the second plurality of ordered signals. It should be noted that the power accumulation may be performed without the subcarrier reorder 611. The scope of the present disclosure is not limited in this regard.

The power accumulator and estimator 613 is configured to accumulate powers for the first plurality of ordered signals and the second plurality of ordered signals, respectively. The power accumulator and estimator 613 is further configured to determine power estimations of signal plus noise for the first plurality of ordered signals and the second plurality of ordered signals based on the following equations, for example:

$$P_k = \sum_i |y_{i,k}|^2 \quad (1)$$

where k represents an index of a subcarrier, i represents an index of a symbol in a symbol group, $y_{i,k}$ represents a symbol i received on the subcarrier k, $P_k$ represents a power estimation. It will be understood that if a subcarrier is not used by the terminal device for transmitting a random access preamble, a signal received by the network device on the subcarrier includes only noise. In this regard, $y_{i,k}$ represents signal plus noise received on the subcarrier k. If the subcarrier is used for transmitting the random access preamble, the signal received on the subcarrier includes a signal after propagation channel and frequency rotation and the noise. In this regard, $y_{i,k}$ represents noise received on the subcarrier k.

In some embodiments, upon determining the power estimations of the first plurality of ordered signals and the power estimations of the second plurality of ordered signals, the power accumulator and estimator 613 may determine a first average power estimation over time for the first plurality of ordered signals and a second average power estimation over time for the second plurality of ordered signals.

In some embodiments, as shown in CASE 2 of FIG. 5, since a time length of the second plurality of ordered signals is different from a time length of the first plurality of ordered signals, the power accumulator and estimator 613 may scale the power estimations of the second plurality of ordered signals by the overlapping ration to obtain the scaled power estimations.

The first noise estimator 614 is configured to determine power estimations of noise for each of the first plurality of ordered signals and for each of the second plurality of ordered signals based on the following equation, for example:

$$P_n = \sum_{i,j} |y_i - y_j|^2 \quad (2)$$

where $y_i$ represents a symbol within a symbol group, $y_j$ represents a symbol that is adjacent to the symbol $y_i$ within the symbol group, $P_n$ represents a power estimation of noise for a symbol group.

In some embodiments, the first SNR estimator 615 may be configured to determine Signal Noise Ratio (SNR) estimations for the first plurality of ordered signals and SNR estimations for the second plurality of ordered signals. The first detector 616 may be configured to compare each of the SNR estimations for the first plurality of ordered signals and the SNR estimations for the second plurality of ordered signals with a second threshold 619. The second threshold 619 may be determined based on the required accuracy.

If the SNR estimation for a first ordered signal exceeds the second threshold, the first detector 616 may determine that the first ordered signal includes a random access preamble. Otherwise, the first detector 616 may determine that the first ordered signal includes only noise. In this way, for the first and second coverage levels, the system 600 may determine the number of the subcarriers that are used by terminal devices in the cell 302 to transmit random access preambles and the number of the subcarriers that are not used. In addition, for the first coverage level, the first detector 616 may determine a first set of indexes of the subcarriers that are used. Similarly, for the second coverage level, the first detector 616 may determine a second set of indexes of the subcarriers that are used.

In other embodiments, for ease of implementation, the system 600 may not include the first SNR estimator 615. In such embodiments, the first detector 616 may be configured to compare each of the power estimations of signal plus noise for the first plurality of ordered signals and the second plurality of ordered signals with a fourth threshold. The fourth threshold is different from the second threshold 619.

If the power estimation for a first ordered signal exceeds the fourth threshold, the first detector 616 may determine that the first ordered signal includes a random access preamble. Otherwise, the first detector 616 may determine that the first ordered signal includes only noise. In this way, for the first and second coverage levels, the system 600 may determine the number of the subcarriers that are used by terminal devices in the cell 302 to transmit random access preambles and the number of the subcarriers that are not used.

It can be seen from the equations (1) and (2) that the principle of the power estimation of signal plus noise and the principle of the power estimation of noise are not correlated, which causes a high false alarm rate.

In order to reduce the false alarm rate, a further detection process is selectively enabled. For the purpose of performing the further detection process, the system 600 further includes a second noise estimator 621, a second SNR estimator 622, and a second detector 623.

After the detection by the first detector 616, for the first and second coverage levels, the number of the subcarriers that are not used by the terminal devices will be compared with a third threshold. The third threshold may be determined based on the required accuracy. If the number of the subcarriers that are not used exceeds the third threshold, the further detection process will be enabled. Otherwise, the further detection process will be disabled.

In the case where the further detection process is disabled, the first removal module 631 is configured to remove the second set of indexes of the subcarriers and output the first set of indexes of the subcarriers as a first result 633 of detection.

In the case where the further detection process is enabled, it may be assumed that a first number of signals of the first plurality of ordered signals and a second number of signals of the second plurality of ordered signals are received on the subcarriers that are not used. For each of the first number of signals and the second number of signals, the respective power estimations of signal plus noise are considered as power estimations of noise. The power estimations of noise are input into the second noise estimator 621.

The second noise estimator 621 is configured to determine an average power estimation of noise over frequency for the first number of signals and the second number of signals. In other words, not only the power estimations of noise for the first number of signals, and the power estimations of noise for the second number of signals are used as statistic samples for determining the average power estimation of noise. Thus, the number of statistic samples for determining the average power estimation of noise is increased, thereby reducing error of estimation.

In addition, because the average power estimation of noise is with respect to the subcarriers that are determined by the first detector 616 as unused subcarriers, the average power estimation of noise is more accurate.

The second SNR estimator 622 is configured to determine, based on the average power estimation of noise from the second noise estimator 621, a first plurality of SNR estimations for the first plurality of ordered signals and a second plurality of SNR estimations for the second plurality of ordered signals.

The second detector 623 is configured to compare each of the first plurality of SNR estimations and the second plurality of SNR estimations with the second threshold 619.

If the first SNR estimation for a first ordered signal exceeds the second threshold 619, the second detector 623 may determine that the first ordered signal includes a random access preamble. Otherwise, the second detector 623 may determine that the first ordered signal includes only noise. In this way, for the first coverage level, the system 600 may determine which subcarriers are used by the terminal devices in the cell 302 to transmit random access preambles. For example, for the first coverage level, the second detector 623 may determine a third set of indexes of the subcarriers that are used. Similarly, for the second coverage level, the second detector 623 may determine a fourth set of indexes of the subcarriers that are used.

The second removal module 632 is configured to remove the fourth set of indexes of the subcarriers and output the third set of indexes of the subcarriers as a second result 634 of detection.

In the further detection process, because the average power estimation of noise is more accurate, the error of estimation will be reduced.

Figure 7:
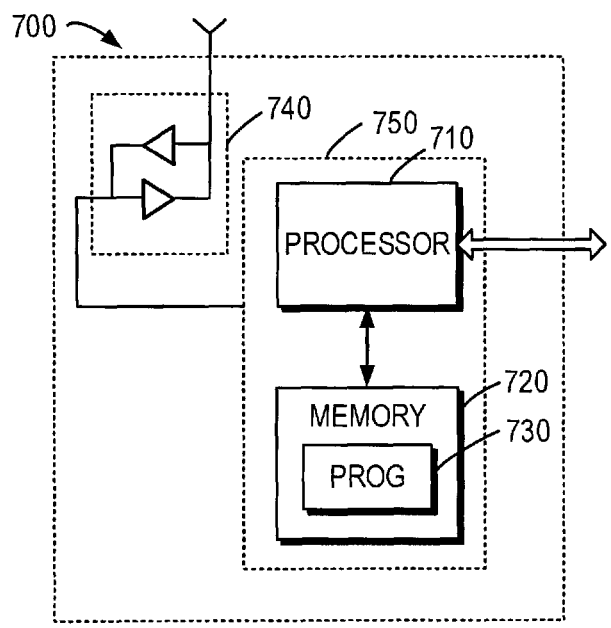
FIG. 7 shows a block diagram of a device suitable for implementing embodiments of the present disclosure.

FIG. 7 is a simplified block diagram of a device 700 that is suitable for implementing embodiments of the present disclosure. The device 700 can be considered as a further example implementation of the network device 310 as shown in FIG. 3 or the system 600 as shown in FIG. 6. Accordingly, the device 700 can be implemented at or as at least a part of the network device 310.

As shown, the device 700 includes a processor 710, a memory 720 coupled to the processor 710, a suitable transmitter (TX) and receiver (RX) 740 coupled to the processor 710, and a communication interface coupled to the TX/RX 740. The memory 720 stores at least a part of a program 730. The TX/RX 740 is for bidirectional communications. The TX/RX 740 has at least one antenna to facilitate communication, though in practice an Access Node mentioned in this application may have several ones. The communication interface may represent any interface that is necessary for communication with other network elements, such as X2 interface for bidirectional communications between eNBs, S1 interface for communication between a Mobility Management Entity (MME)/Serving Gateway (S-GW) and the eNB, Un interface for communication between the eNB and a relay node (RN), or Uu interface for communication between the eNB and a terminal device.

The program 730 is assumed to include program instructions that, when executed by the associated processor 710, enable the device 700 to operate in accordance with the embodiments of the present disclosure, as discussed herein with reference to FIGS. 1 to 6. The embodiments herein may be implemented by computer software executable by the processor 710 of the device 700, or by hardware, or by a combination of software and hardware. The processor 710 may be configured to implement various embodiments of the present disclosure. Furthermore, a combination of the processor 710 and memory 720 may form processing means 750 adapted to implement various embodiments of the present disclosure.

The memory 720 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 720 is shown in the device 700, there may be several physically distinct memory modules in the device 700. The processor 710 may be of any type suitable to the local technical network, and may include one or more of general purpose computers, special purpose computers, microprocessors, digital signal processors (DSPs) and processors based on multicore processor architecture, as non-limiting examples. The device 700 may have multiple processors, such as an application specific integrated circuit chip that is slaved in time to a clock which synchronizes the main processor.

Generally, various example embodiments of the present disclosure may be implemented in hardware, special purpose circuits, software, logic or any combinations thereof. Some aspects may be implemented in hardware while other aspects may be implemented in firmware or software executed by controllers, microprocessors or other computing devices. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

As an example, embodiments of the present disclosure may be described in the context of machine-executable instructions, which is included in program modules executed in devices on a target physical or virtual processor, for example. In general, program modules comprise routines, programs, libraries, objects, classes, components, data structures, and the like, that perform particular tasks or implement particular abstract data structures. The functionality of the program modules may be combined or split between program modules as desired in various embodiments. Machine-executable instructions for program modules may be executed within a local or distributed device. In a distributed device, program modules may be located in both local and remote storage media.

Computer program codes for carrying out methods of the present disclosure may be written in any combination of one or more programming languages. The computer program codes may be provided to a processor of a general-purpose computer, a special purpose computer or other programmable data processing apparatuses, such that the program codes, when executed by the computer or other programmable data processing apparatuses, cause the functions/operations specified in the flowcharts and/or block diagrams to be implemented. The program codes may be executed entirely on a machine, partly on the machine, as a stand-alone software package, partly on the machine and partly on a remote machine or entirely on the remote machine or server.

In the context of the present disclosure, a machine-readable medium may be any tangible medium that contains or stores programs for or related to an instruction executing system, apparatus or device. The machine-readable medium may be a machine-readable signal medium or a machine-readable storage medium and may include but not limited to an electronic, magnetic, optical, electromagnetic, infrared, or semiconductor system, apparatus or device, or any suitable combination thereof. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination thereof.

Furthermore, although operations are depicted in a particular order, it is to be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A network device, comprising: a processor; and a memory including instructions, the instructions, when executed by the processor, causing the network device to perform acts, the acts comprising:
    determining whether an overlapping ratio between a first period and a second period exceeds a first threshold, a first narrowband physical random access channel (NPRACH) resource being available during the first period, a second NPRACH resource being available during the second period, the first NPRACH resource being associated with a first coverage level and the second NPRACH resource being associated with a second coverage level that is different from the first coverage level;
    in response to determining that the overlapping ratio exceeds the first threshold, determining a power estimation of noise based on a first plurality of signals received on the first NPRACH resource and a second plurality of signals received on the second NPRACH resource; and
    detecting existence of at least one random access preamble on the first NPRACH resource based on the power estimation of noise.

2. The network device of claim 1, wherein determining the power estimation of noise comprises:
    extracting, from the second plurality of signals, signals that are received over a time segment of the second period, the time segment overlapping with the first period; and
    determining the power estimation of noise based on the first plurality of signals and the extracted signals.

3. The network device of claim 2, wherein determining the power estimation of noise based on the first plurality of signals and the extracted signals comprises:
    determining power estimations of the extracted signals;
    scaling the power estimations by the overlapping ratio to obtain the scaled power estimations; and
    in response to the scaled power estimation of at least one of the extracted signals being below a second threshold, determining the at least one of the extracted signals as a statistic sample for determining the power estimation of noise.

4. The network device of claim 1, wherein the second NPRACH resource includes a first resource segment and a second resource segment, the first resource segment is within a fist frequency hopping period and the second resource segment is within a second frequency hopping period that is subsequent to the fist frequency hopping period.

5. The network device of claim 1, wherein the first threshold is greater than zero.

6. A method implemented in a network device, comprising:
- determining whether an overlapping ratio between a first period and a second period exceeds a first threshold, a first narrowband physical random access channel (NPRACH) resource being available during the first period, a second NPRACH resource being available during the second period, the first NPRACH resource being associated with a first coverage level and the second NPRACH resource being associated with a second coverage level that is different from the first coverage level;
- in response to determining that the overlapping ratio exceeds the first threshold, determining a power estimation of noise based on a first plurality of signals received on the first NPRACH resource and a second plurality of signals received on the second NPRACH resource; and
- detecting existence of at least one random access preamble on the first NPRACH resource based on the power estimation of noise.

7. The method of claim 6, wherein determining the power estimation of noise comprises:
- extracting, from the second plurality of signals, signals that are received over a time segment of the second period, the time segment overlapping with the first period; and
- determining the power estimation of noise based on the first plurality of signals and the extracted signals.

8. The method of claim 7, wherein determining the power estimation of noise based on the first plurality of signals and the extracted signals comprises:
- determining power estimations of the extracted signals;
- scaling the power estimations by the overlapping ratio to obtain the scaled power estimations; and
- in response to the scaled power estimation of at least one of the extracted signals being below a second threshold, determining the at least one of the extracted signals as a statistic sample for determining the power estimation of noise.

9. The method of claim 6, wherein the second NPRACH resource includes a first resource segment and a second resource segment, the first resource segment is within a fist frequency hopping period and the second resource segment is within a second frequency hopping period that is subsequent to the fist frequency hopping period.

10. A non-transitory computer readable medium having instructions stored thereon, the instructions, when executed on at least one processor, causing the at least one processor to carry out acts, the acts comprising:
- determining whether an overlapping ratio between a first period and a second period exceeds a first threshold, a first narrowband physical random access channel (NPRACH) resource being available during the first period, a second NPRACH resource being available during the second period, the first NPRACH resource being associated with a first coverage level and the second NPRACH resource being associated with a second coverage level that is different from the first coverage level;
- in response to determining that the overlapping ratio exceeds the first threshold, determining a power estimation of noise based on a first plurality of signals received on the first NPRACH resource and a second plurality of signals received on the second NPRACH resource; and
- detecting existence of at least one random access preamble on the first NPRACH resource based on the power estimation of noise.

11. The non-transitory computer readable medium of claim 10, determining the power estimation of noise comprises:
- extracting, from the second plurality of signals, signals that are received over a time segment of the second period, the time segment overlapping with the first period; and
- determining the power estimation of noise based on the first plurality of signals and the extracted signals.

12. The non-transitory computer readable medium of claim 11, wherein determining the power estimation of noise based on the first plurality of signals and the extracted signals comprises:
- determining power estimations of the extracted signals;
- scaling the power estimations by the overlapping ratio to obtain the scaled power estimations; and
- in response to the scaled power estimation of at least one of the extracted signals being below a second threshold, determining the at least one of the extracted signals as a statistic sample for determining the power estimation of noise.

13. The non-transitory computer readable medium of claim 10, wherein the second NPRACH resource includes a first resource segment and a second resource segment, the first resource segment is within a fist frequency hopping period and the second resource segment is within a second frequency hopping period that is subsequent to the fist frequency hopping period.

* * * * *